United States Patent
Leitner

(10) Patent No.: US 6,830,257 B2
(45) Date of Patent: Dec. 14, 2004

(54) RETRACTABLE VEHICLE STEP

(75) Inventor: Horst Leitner, Laguna Beach, CA (US)

(73) Assignee: American Moto Products, Inc., Irvine, CA (US)

( * ) Notice: Subject to any disclaimer, the term of this patent is extended or adjusted under 35 U.S.C. 154(b) by 0 days.

(21) Appl. No.: 10/689,254

(22) Filed: Oct. 20, 2003

(65) Prior Publication Data

US 2004/0124601 A1 Jul. 1, 2004

Related U.S. Application Data

(63) Continuation of application No. 09/817,897, filed on Mar. 26, 2001, now Pat. No. 6,641,158.
(60) Provisional application No. 60/274,417, filed on Mar. 8, 2001, and provisional application No. 60/269,286, filed on Feb. 15, 2001.

(30) Foreign Application Priority Data

Feb. 15, 2002 (WO) ............................... PCT/US02/04767
Aug. 16, 2002 (WO) ............................... PCT/US02/33586

(51) Int. Cl.[7] ............................. B60R 3/00; B60P 1/43; E04G 3/00; B61D 23/00; B62D 25/00
(52) U.S. Cl. ....................... 280/166; 280/163; 280/169; 280/727; 182/88; 182/91; 105/443; 296/62
(58) Field of Search ................................. 280/166, 163, 280/169, 727; 182/88, 91, 127; 105/443, 444, 445, 447, 448; 414/558; 296/62; 318/466

(56) References Cited

U.S. PATENT DOCUMENTS 2,436,961 A 3/1948 Gabriel (List continued on next page.)

FOREIGN PATENT DOCUMENTS

DE 31 51 621 A1 12/1981

(List continued on next page.)

OTHER PUBLICATIONS

Suppliers; AAS looks at New Markets.(Advanced Accessory Systems LLC) (Brief Article) (Product Announcement); Ward's Auto World, pNA, Dec., 2000.

(List continued on next page.)

*Primary Examiner*—Bryan Fischmann
*Assistant Examiner*—G B Klebe
(74) *Attorney, Agent, or Firm*—Knobbe Martens Olson & Bear LLP

(57) ABSTRACT

A retractable step for use with a vehicle comprises a stepping member having a stepping deck, a first arm, a second arm, a motor and a stop. The first arm has a first end pivotally attached to the vehicle, and a second end pivotally attached to the stepping member. The second arm also has a first end pivotally attached to the vehicle, and a second end pivotally attached to the stepping member. The motor is drivingly connected to the first arm such that a rotation of the motor causes rotation of the first arm about its first end and moves the stepping member from a retracted position to an extended position, or vice versa. The stop is located within the range of motion of the second arm such that the second arm bears against the stop when the stepping member is in the extended position. The first and second arms are situated such that the first arm is loaded in compression and the second arm is loaded in tension when the stepping member is in the extended position and a load is placed upon it. In another embodiment, a retractable vehicle step assist comprises a rigid frame, a forward planar linkage pivotably connected to the frame along a forward upper connection width, and a rearward planar linkage pivotably connected to the frame along a rearward upper connection width. The retractable vehicle step further comprises a rigid step member having a stepping deck. The step member is pivotably connected to the forward planar linkage along a forward lower connection width, and is pivotably connected to the rearward planar linkage along a rearward lower connection width and on a side of the forward planar linkage opposite the stepping deck. The stepping deck is substantially wider than any of the forward upper connection width, the rearward upper connection width, the forward lower connection width, and the rearward lower connection width.

13 Claims, 6 Drawing Sheets

U.S. PATENT DOCUMENTS

| | | | |
|---|---|---|---|
| 2,487,921 A | | 11/1949 | Culver |
| 2,575,615 A | | 11/1951 | Crump |
| 2,764,422 A | | 9/1956 | McDonald |
| 2,925,876 A | | 2/1960 | Wagner |
| 3,039,562 A | | 6/1962 | Wagner |
| 3,172,499 A | | 3/1965 | Stairs |
| 3,528,574 A | | 9/1970 | Denner et al. |
| 3,833,240 A | | 9/1974 | Weiler |
| 3,865,399 A | * | 2/1975 | Way ............................ 280/166 |
| 3,887,217 A | | 6/1975 | Thomas |
| 3,889,997 A | | 6/1975 | Schoneck |
| 3,957,284 A | | 5/1976 | Wright |
| 4,020,920 A | | 5/1977 | Abbott |
| 4,073,502 A | | 2/1978 | Frank et al. |
| 4,106,790 A | | 8/1978 | Weiler |
| 4,110,673 A | | 8/1978 | Magy et al. |
| 4,116,457 A | | 9/1978 | Nerem et al. |
| 4,180,143 A | | 12/1979 | Clugston |
| 4,188,889 A | | 2/1980 | Favrel |
| 4,623,160 A | | 11/1986 | Trudell |
| 4,720,116 A | | 1/1988 | Williams et al. |
| 4,733,752 A | | 3/1988 | Sklar |
| 4,909,700 A | | 3/1990 | Fontecchio et al. |
| 4,982,974 A | | 1/1991 | Guidry |
| 5,085,450 A | | 2/1992 | DeHart, Sr. |
| 5,154,125 A | | 10/1992 | Renner et al. |
| 5,199,731 A | | 4/1993 | Martin |
| 5,257,847 A | | 11/1993 | Yonehara |
| 5,284,349 A | | 2/1994 | Bruns et al. |
| 5,286,049 A | | 2/1994 | Khan |
| 5,375,864 A | | 12/1994 | McDaniel |
| 5,462,302 A | | 10/1995 | Leitner |
| 5,498,012 A | | 3/1996 | McDaniel et al. |
| 5,505,476 A | | 4/1996 | Maccabee |
| 5,538,100 A | | 7/1996 | Hedley |
| 5,538,269 A | | 7/1996 | McDaniel et al. |
| 5,547,040 A | | 8/1996 | Hanser et al. |
| 5,601,300 A | | 2/1997 | Fink et al. |
| 5,842,709 A | * | 12/1998 | Maccabee .................. 280/166 |
| 5,941,342 A | | 8/1999 | Lee |
| 5,957,237 A | | 9/1999 | Tigner |
| 6,082,751 A | | 7/2000 | Hanes et al. |
| 6,149,172 A | | 11/2000 | Pascoe et al. |
| 6,213,486 B1 | | 4/2001 | Kunz et al. |
| 6,270,099 B1 | | 8/2001 | Farkash |
| 6,375,207 B1 | * | 4/2002 | Dean et al. ................. 280/166 |
| 6,435,534 B1 | | 8/2002 | Stone |
| 6,641,158 B2 | | 11/2003 | Leitner |

FOREIGN PATENT DOCUMENTS

| | | |
|---|---|---|
| DE | 89 10 933.3 | 9/1989 |
| GB | 93 4387 | 8/1963 |
| JP | 63 255144 | 10/1988 |
| JP | 4-339040 | 11/1992 |

OTHER PUBLICATIONS

AN Archives; Weeks of Nov. 13–26, 1977; Powerforce pickup; http:/tms.ecol.net/newcars/auto 1113.htm.

Camping World advertisement.

U.S. Appl. No. 10/274,418, filed Oct. 16, 2002, Leitner et al.

U.S. Appl. No. 10/641,358, filed Aug. 14, 2003, Leitner.

U.S. Appl. No. 10/643,708, filed Aug. 19, 2003, Leitner et al.

* cited by examiner

RETRACTABLE VEHICLE STEP

RELATED APPLICATIONS

This application is a continuation of U.S. patent application Ser. No. 09/817,897, filed Mar. 26, 2001, now U.S. Pat. No. 6,641,158 titled RETRACTABLE VEHICLE STEP, which claims the benefit of U.S. Provisional Application No. 60/269,286, filed Feb. 15, 2001, titled RETRACTABLE VEHICLE STEP; and of U.S. Provisional Application No. 60/274,417, filed Mar. 8, 2001, titled RETRACTABLE VEHICLE STEP. The entire contents of each of the above-mentioned patent applications and prior patent applications are hereby incorporated by reference herein and made a part of this specification.

BACKGROUND OF THE INVENTION

1. Field of the Invention

This invention relates generally to a stepping assist for motor vehicles. In particular, the invention relates to a retractable vehicle step which is movable between a retracted or storage position and an extended position in which it functions as a step assist into the vehicle.

2. Description of the Related Art

It is commonly known to add a running board or similar fixed stepping assist to the side of a motor vehicle, especially to a vehicle with a relatively high ground clearance. However, these fixed running boards and other stepping assists have had several drawbacks. First, a fixed running board is often too high to act as a practical stepping assist and is therefore not very effective in reducing the initial step height for the vehicle user. In addition, when using a relatively high running board, the user is likely to hit his or her head while climbing into the vehicle cab. Furthermore, a fixed running board often extends a significant distance from the side of the vehicle, and can be a source of dirt or grime that rubs onto the user's pants or other clothing as the user steps out of the vehicle onto the ground surface. Such a fixed running board is also frequently struck when the owner of an adjacent parked vehicle opens his door. Finally, a fixed running board or step reduces the ground clearance of a vehicle, and can often be damaged or torn off entirely when the vehicle is used for offroad driving.

Accordingly, a vehicle step which overcomes the above-stated problems is desired.

SUMMARY OF THE INVENTION

In accordance with one preferred embodiment, a retractable step for use with a vehicle comprises a stepping member having a stepping deck, a first arm, a second arm, a motor and a stop. The first arm has a first end pivotally attached to the vehicle, and a second end pivotally attached to the stepping member. The second arm also has a first end pivotally attached to the vehicle, and a second end pivotally attached to the stepping member. The motor is drivingly connected to the first arm such that a rotation of the motor causes rotation of the first arm about its first end and moves the stepping member from a retracted position to an extended position, or vice versa. The stop is located within the range of motion of the second arm such that the second arm bears against the stop when the stepping member is in the extended position. The first and second arms are situated such that the first arm is loaded in compression and the second arm is loaded in tension when the stepping member is in the extended position and a load is placed upon it.

In accordance with another embodiment, a retractable vehicle step assist comprises a rigid frame, a forward planar linkage pivotably connected to the frame along a forward upper connection width, and a rearward planar linkage pivotably connected to the frame along a rearward upper connection width. The retractable vehicle step further comprises a rigid step member having a stepping deck. The step member is pivotably connected to the forward planar linkage along a forward lower connection width, and is pivotably connected to the rearward planar linkage along a rearward lower connection width and on a side of the forward planar linkage opposite the stepping deck. The stepping deck is substantially wider than any of the forward upper connection width, the rearward upper connection width, the forward lower connection width, and the rearward lower connection width.

In accordance with yet another preferred embodiment a retractable vehicle step assist for use with a vehicle having two adjacent doors through which persons may enter the vehicle, comprises a rigid frame, a step member having a stepping deck, and at least two rigid arms connecting the step member to the frame and allowing the step member to move between a retracted position near the frame to a deployed position downward and away from the frame. The stepping deck is of sufficient width to provide a step for persons desiring to enter either of the doors.

In accordance with still another preferred embodiment, a retractable vehicle step assist for use with a vehicle having two adjacent doors through which persons may enter the vehicle, comprises a rigid frame and a step member having a stepping deck. The retractable step assist further comprises at least two rigid arms connecting the step member to the frame and allowing the step member to move between a retracted position near the frame to a deployed position downward and away from the frame. The stepping deck extends in front of each of the doors when in the deployed position.

In accordance with still another preferred embodiment, a retractable vehicle step assist comprises a rigid frame, a step member having a stepping deck, and at least two rigid arms connecting the step member to the frame and allowing the step member to move between a retracted position near the frame to a deployed position downward and away from the frame. The stepping deck is substantially wider than the frame.

In accordance with still another preferred embodiment, a retractable vehicle step assist comprises a rigid frame, a step member having a stepping deck, and a forward rigid arm and a rearward rigid arm connecting the step member to the frame and allowing the step member to move between a retracted position near the frame to a deployed position downward and away from the frame. The step member is pivotably connected to the rearward rigid arm at a rearward pivotable connection and the step member rotates downward about the rearward pivotable connection as the step member moves to the deployed position.

In accordance with still another preferred embodiment, a retractable vehicle step assist comprises a rigid frame, a step member having a stepping deck, and at least two rigid arms connecting the step member to the frame and allowing the step member to move between a retracted position near the frame to a deployed position downward and away from the frame. The stepping member further comprises a support bracket rigidly connected to the stepping deck and connected to the arms opposite the stepping deck. The support bracket is oriented at an angle to the stepping deck.

In accordance with still another preferred embodiment, a method of improving access to a vehicle through a door of the vehicle, comprises attaching a rigid frame to the vehicle, and connecting a stepping member having a stepping deck to the frame via at least two rigid arms. This is done so that the stepping member is moveable between a retracted position near the frame to a deployed position wherein the stepping deck is situated along the side of the vehicle below the door. In the method the stepping deck is substantially wider than the frame.

In accordance with another embodiment, a retractable vehicle step assembly comprises a step member having a stepping deck and a bracket extending inboard from the stepping deck. The assembly further comprises a first unitary support arm defining an inboard surface and an outboard surface. A maximum distance between the inboard surface and the outboard surface defines a first thickness, and the first support arm defines a substantially vertical first side and a substantially vertical second side. A maximum distance between the first side and the second side defines a first width, and the first width is substantially greater than the first thickness. The assembly further comprises a second unitary support arm defining an inboard surface and an outboard surface. A maximum distance between the inboard surface and the outboard surface defines a second thickness. The second support arm defines a substantially vertical first side and a substantially vertical second side, and a maximum distance between the first side and the second side defines a second width. The second width is substantially greater than the second thickness. The first support arm and the second support arm are connectable with respect to an underside of a vehicle so as to be pivotable about a first axis and a second axis, respectively. The first support arm and the second support arm are connected to the step member so that the first support arm and the second support arm are pivotable with respect to the bracket about a third axis and a fourth axis, respectively, the fourth axis being located inboard from the third axis. The first support arm and the second support arm allow the step member to move between a retracted position and a deployed position downward and outboard from the retracted position. The stepping deck further comprises an upper surface which defines a plane for supporting at least the forefoot of a user. The angle of the plane with respect to the horizontal varies as, the step member moves between the retracted position and the deployed position. The first axis is spaced from the third axis by a first distance, and the second axis is spaced from the fourth axis by a second distance. The first distance and the second distance are unequal. The bracket is entirely supported by the first support arm and the second support arm when the step member is in the deployed position.

In accordance with another embodiment, a retractable vehicle step assist comprises a step member having a stepping deck and a support bracket portion extending inboard from the stepping deck. The step assist further comprises a first unitary support arm defining an inboard surface and an outboard surface, and a maximum distance between the inboard surface and the outboard surface defines a first thickness. The first support arm defines a substantially vertical first side and a substantially vertical second side, a maximum distance between the first side and the second side defining a first width. The first width is substantially greater than the first thickness. The step assist further comprises a second unitary support arm defining an inboard surface and an outboard surface, and a maximum distance between the inboard surface and the outboard surface defines a second thickness. The second support arm defines a substantially vertical first side and a substantially vertical second side, and a maximum distance between the first side and the second side defines a second width. The second width is substantially greater than the second thickness. The first support arm and the second support arm are connectable with respect to an underside of a vehicle so as to be pivotable about a first pivot axis and a second pivot axis, respectively. The first support arm and the second support arm are connected to the step member so that the first support arm and the second support arm are pivotable with respect to the step member about a third pivot axis and a fourth pivot axis, respectively. The fourth pivot axis is located inboard from the third pivot axis. The first support arm and the second support arm allow the step member to move between a retracted position and a deployed position downward and outboard from the retracted position. The stepping deck further comprises an upper surface which defines a plane for supporting at least the forefoot of a user. The angle of the plane with respect to the horizontal varies as the step member moves between the retracted position and the deployed position. The first pivot axis is spaced from the third pivot axis by a first distance, and the second pivot axis is spaced from the fourth pivot axis by a second distance. The first distance and the second distance are unequal. The support bracket portion provides a recessed area into which the first support arm is inserted at the third pivot axis.

In accordance with another embodiment, a retractable vehicle step assist comprises a step member having a stepping deck and a support bracket portion extending inboard from the stepping deck. The step assist further comprises a first unitary support arm defining an inboard surface and an outboard surface, and a maximum distance between the inboard surface and the outboard surface defines a first thickness. The first support arm defines a substantially vertical first side and a substantially vertical second side, a maximum distance between the first side and the second side defining a first width. The first width is substantially greater than the first thickness. The step assist further comprises a second unitary support arm defining an inboard surface and an outboard surface, and a maximum distance between the inboard surface and the outboard surface defines a second thickness. The second support arm defines a substantially vertical first side and a substantially vertical second side, and a maximum distance between the first side and the second side defines a second width. The second width is substantially greater than the second thickness. The first support arm and the second support arm are connectable with respect to an underside of a vehicle so as to be pivotable about a first pivot axis and a second pivot axis, respectively. The first support arm and the second support arm are connected to the step member so that the first support arm and the second support arm are pivotable with respect to the step member about a third pivot axis and a fourth pivot axis, respectively. The fourth pivot axis is located inboard from the third pivot axis. The first support arm and the second support arm allow the step member to move between a retracted position and a deployed position downward and outboard from the retracted position. The stepping deck further comprises an upper surface which defines a plane for supporting at least the forefoot of a user. The angle of the plane with respect to the horizontal varies as the step member moves between the retracted position and the deployed position. The first pivot axis is spaced from the third pivot axis by a first distance, and the second pivot axis is spaced from the fourth pivot axis by a second distance. The first distance and the second distance are unequal. The support bracket portion provides an opening in an upper surface of the support bracket portion into which opening the first support arm is inserted at the third pivot axis.

All of these and other embodiments are intended to be within the scope of the invention herein disclosed. This and other embodiments of the present invention will become readily apparent to those skilled in the art from the following detailed description of the preferred embodiments having reference to the attached figures, the invention not being limited to any particular preferred embodiment or embodiments disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which.

DETAILED DESCRIPTION OF THE PREFERRED EMBODIMENT

Figure 1:
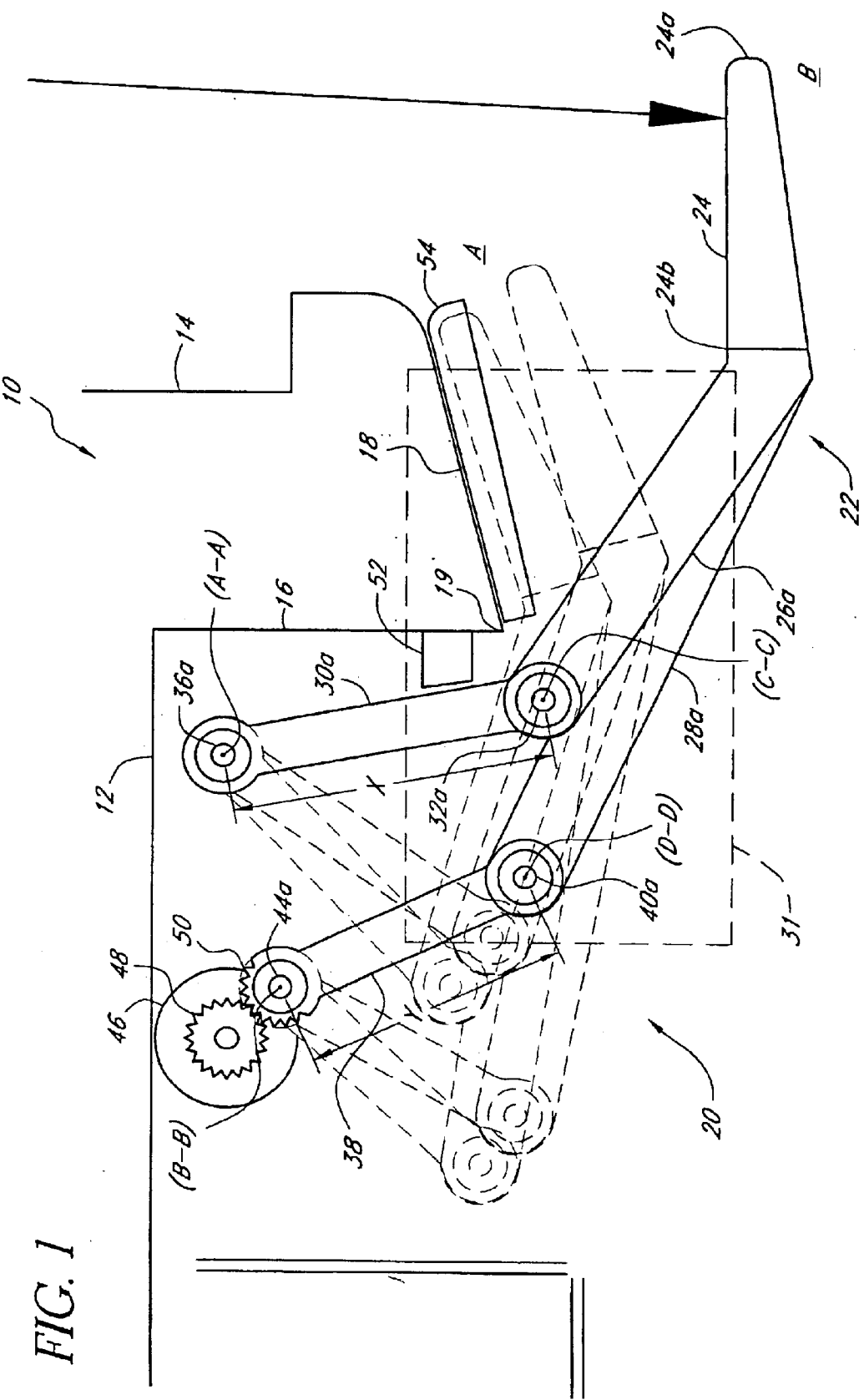
FIG. 1 is a side elevation view of a retractable vehicle step in accordance with one preferred embodiment of the invention.
Figure 2:
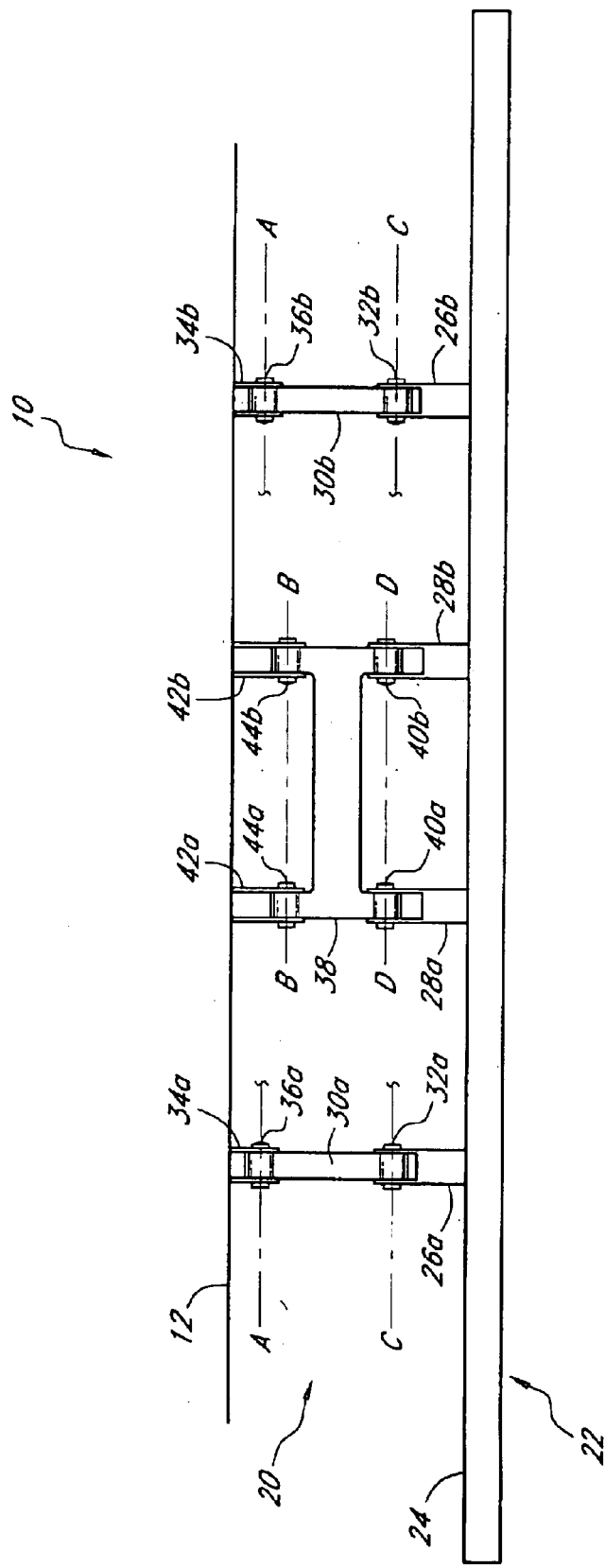
FIG. 2 is a front elevation view of the retractable vehicle step of FIG. 1.

As a preliminary matter, it should be noted that the terms "forward," "front" and "outboard" are used interchangeably herein, as are the terms "rearward," "rear" and "inboard," when describing components of the step structures disclosed herein. These terms are to be understood with reference to a direction of ingress into a vehicle, "forward"/"front"/"outboard" meaning generally toward the exterior of the vehicle, and "rearward"/"rear"/"inboard" meaning generally toward the interior of the vehicle. FIGS. 1 and 2 depict the lower portion of a vehicle 10 having an underbody 12, an exterior 14, a vertical underbody portion 16 and an under panel 18. A retractable vehicle step 20 is shown associated with the vehicle 10. Referring specifically to FIG. 2, the retractable vehicle step 20 has a stepping member 22, which consists of a stepping deck 24 with an outboard end 24a, an inboard end 24b, integrally formed support brackets 26a, 26b, and drive brackets 28a, 28b located inward of the support brackets 26a, 26b. The support brackets 26a, 26b are pivotally connected to support arms 30a, 30b via clevis pins 32a, 32b, at an end of the support brackets 26a, 26b opposite the stepping deck 24. Similarly, the support arms 30a, 30b are pivotally connected to anchor brackets 34a, 34b via clevis pins 36a, 36b, at an end of each support arm opposite the support brackets 26a, 26b. The anchor brackets 34a, 34b are rigidly connected to the underbody 12 by welding, bolting, riveting or other techniques known to those skilled in the art.

The drive brackets 28a, 28b of the stepping member 22 are pivotally connected to a drive arm 38 via clevis pins 40a, 40b, at an end of the drive brackets 28a, 28b opposite the stepping deck 24. As best seen in FIG. 2, the drive arm 38 preferably has an H configuration and is pivotally connected to anchor brackets 42a, 42b via clevis pins 44a, 44b at an end of the drive arm 38 opposite the drive brackets 28a, 28b. The anchor brackets 42a, 42b are rigidly connected to the underbody 12 by welding, bolting, riveting or other techniques known to those skilled in the art.

Accordingly, the retractable vehicle step 20 defines the following axes of rotation, best seen in FIG. 2: a first axis A—A about which the support arms 30a, 30b rotate with respect to the underbody 12 and/or anchor brackets 34a, 34b; a second axis B—B about which the drive arm 38 rotates with respect to the underbody 12 and/or anchor brackets 42a, 42b; a third axis C—C about which the support arms 30a, 30b and support brackets 26a, 26b rotate with respect to each other; and a fourth axis D—D about which the drive arm 38 and the drive brackets 28a, 28b rotate with respect to each other. FIG. 1, as a side elevation view of FIG. 2, depicts the axes A—A, B—B, C—C, D—D as points. The first axis A—A is spaced from the third axis C—C by a first distance X and the second axis B—B is spaced from the fourth axis D—D by a second distance Y. (In other words, the first axis A—A is spaced from the rotatable connection of the support arms 30a, 30b to the step member 22 by the first distance X, and the second axis B—B is spaced from the rotatable connection of the drive arm 38 to the step member 22 by the second distance Y.) In one embodiment, the first and second distances X, Y are unequal; in another embodiment the first distance X is greater than the second distance Y. In one embodiment, the first axis A—A is located upward from the second axis B—B.

With reference now to FIG. 1, a motor 46 is rigidly mounted to the underbody 12 on a mounting bracket (not shown) adjacent the retractable vehicle step 20. The motor 46 turns a pinion gear 48 about an axis roughly parallel to the plane defined by the underbody 12. The pinion gear 48 meshes with drive teeth 50 formed at the end of the drive arm 38. Actuation of the motor 46 causes the pinion gear 48 to rotate and the drive arm 38 to counter-rotate with respect to the motor 46 and pinion gear 48, about the clevis pin 44a. As the drive arm 38 rotates it pushes the stepping member 22 by virtue of its connection to the drive brackets 28a, 28b. Thus, when the motor 46 is caused to rotate, the motor 46 moves the retractable vehicle step 20 between a retracted position A wherein the stepping deck is desirably generally positioned inward from the exterior of the vehicle or fixed running board and an extended position B in which the stepping deck is extended sufficiently to provide a step for at least the forefoot portion of a user's foot. As the retractable vehicle step 20 moves between the retracted position A and the extended position B under the power of the motor 46, the support arms 30a, 30b rotate with respect to the clevis pins 36a, 36b and 32a, 32b and support and guide the motion of the retractable vehicle step 20. The extended position B is reached when the support arms 30a, 30b contact a stop 52 which is preferably mounted on the vertical underbody portion 16. In one embodiment (best seen in FIG. 1), the stepping deck 24 is tilted upward when in the retracted position A, with the outboard end 24a located upward from the inboard end 24b.

When the retractable vehicle step 20 is in the extended position B, a downward force exerted on the stepping deck 24 causes the support arms 30a, 30b to bear against the stop 52. This arrangement causes the load on the stepping deck 24 to be borne primarily by the support brackets 26a, 26b, support arms 30a, 30b and the stop 52. In the extended position B, the retractable vehicle step 20 takes on a geometry such that the support brackets 26a, 26b, and support arms 30a, 30b are loaded in tension. The clevis pins 32a, 32b define a pivot axis of the stepping member 22. The torque generated by a load on the stepping deck 24 is opposed by the drive arm 38, which is thus loaded in axial compression between the clevis pins 40a, 40b and 44a, 44b. Because the clevis pins 44a, 44b are fixed in the anchor brackets 42a, 42b, the motor 46 is isolated from the load on the stepping deck 24.

This aspect of the retractable vehicle step 20 prevents damage to the motor by eliminating "back-loading," as there is no torque reaction about the end of the drive arm 38, even when very heavy loads are placed on the stepping deck 24. Thus the motor 46 is not needed to exert a counter-torque on the drive arm 38 to support the load on the stepping deck 24. This feature also eliminates the need for balky, unreliable clutches or any other means of disconnecting the motor 46 from the retractable vehicle step 20, or retractable stops or the like to engage and support the vehicle step 20 when in the extended position.

The retractable vehicle step 20 functions in this manner when in the extended position B so long as the drive arm 38 is rotated further away from the vertical in a counterclockwise direction (as shown in FIG. 1) than are the support arms 30a, 30b. That is, when the drive arm 38 is parallel to, or displaced clockwise beyond parallel to, the support arms 30a, 30b, the drive arm 38 will not maintain the support arms 30a, 30b against the stop 52. Rather, the retractable vehicle step 20 will tend to move toward the retracted position A, and the drive arm 38 will tend to rotate counterclockwise (in FIG. 1) about the clevis pins 44a, 44b. In this situation the motor 46 would be needed to exert a counter-torque on the drive arm 38, to maintain the retractable vehicle step 20 in the extended position B. As mentioned above, it is undesirable to require the motor 46 to function in this manner.

A dust cover or cap 54 may be mounted to the lower body panel 18 to provide a storage location for the stepping member 22 and prevent dust or grime from collecting on the stepping deck 24.

With these features the retractable vehicle step 20 provides a practical stepping assist for a vehicle user, which can be quickly moved into an extended position for use and retracted out of the way when necessary. As detailed above, this functionality is provided with a minimum of mechanical complexity and a high level of reliability. Moreover, the retractable vehicle step 20 is easily connected to a vehicle's existing systems to allow even greater usability. For example, the motor 46 may be connected to the vehicle's electrical system to cause the vehicle step 20 to quickly move to the extended position upon shutting off the vehicle's engine, placing the vehicle in park, opening a door, or signaling the power door-lock system with a remote device or control such as a key fob control. Similarly, the motor 46 may be signaled to retract the vehicle step upon starting the engine, placing the vehicle in drive, closing or locking the door(s) with which the step is associated, etc.

Figure 3:
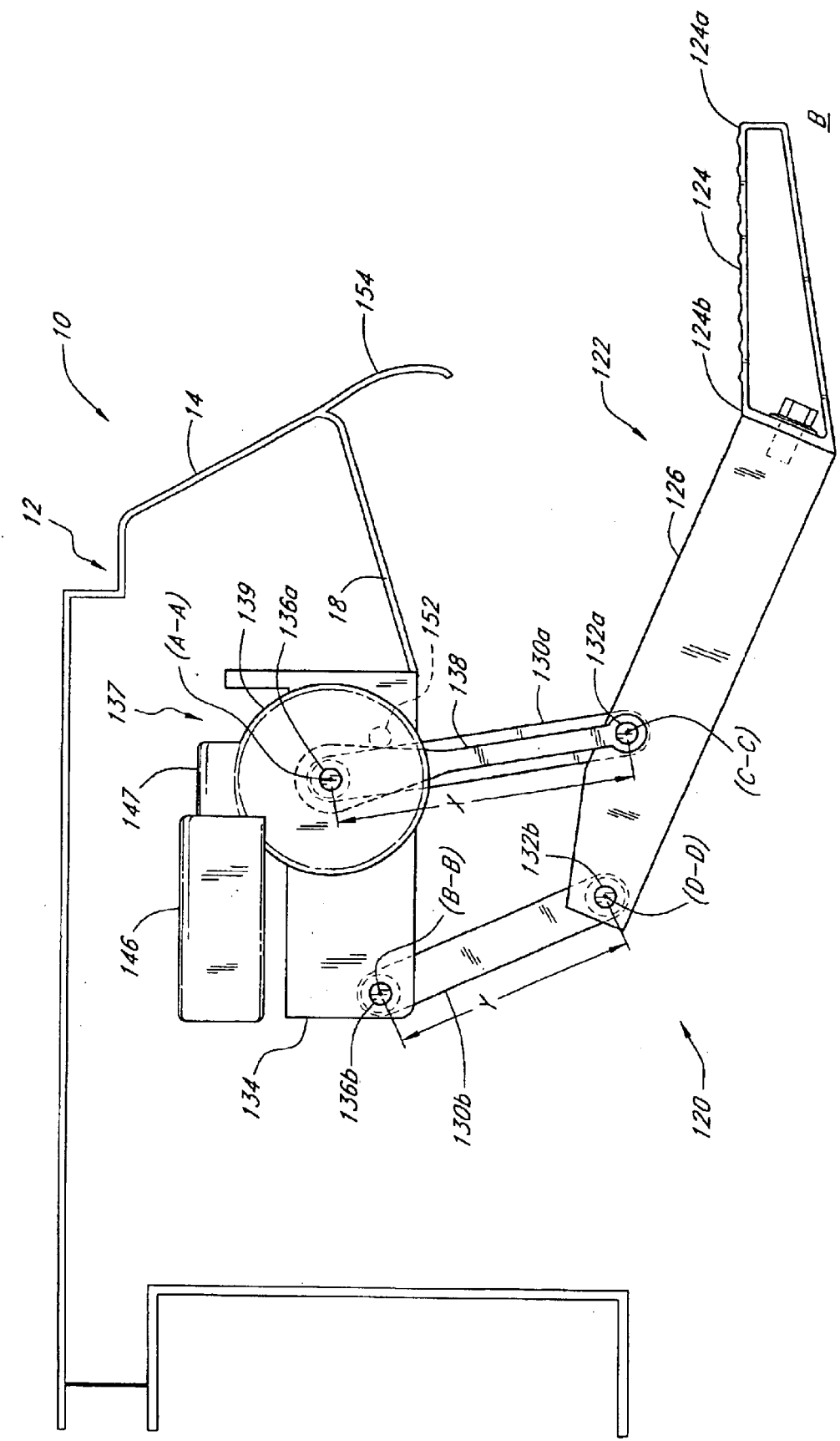
FIG. 3 is a side elevation view of a retractable vehicle step in accordance with another preferred embodiment of the invention, in the deployed position.
Figure 4:
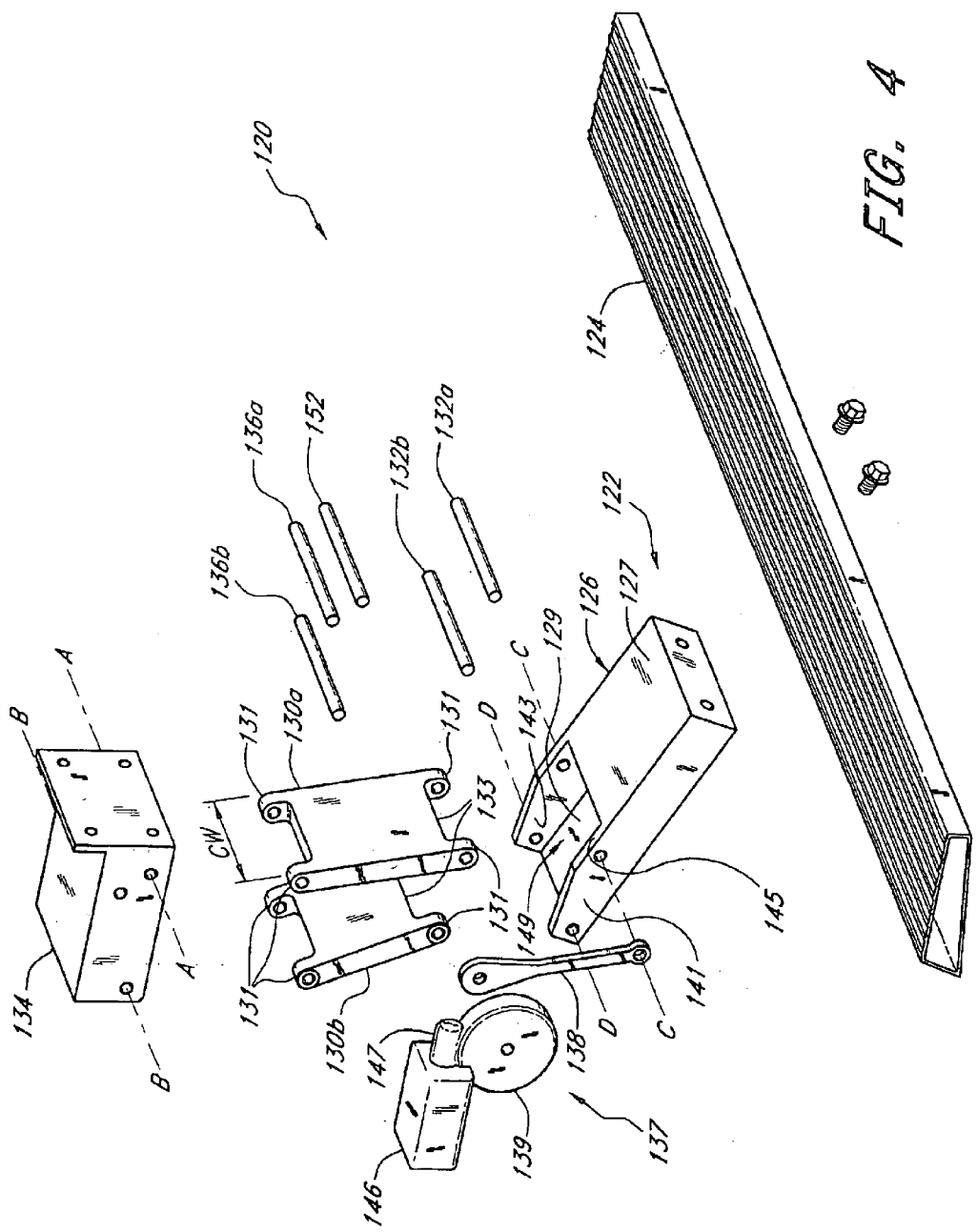
FIG. 4 is an exploded perspective, view of the retractable vehicle step of FIG. 3.
Figure 5:
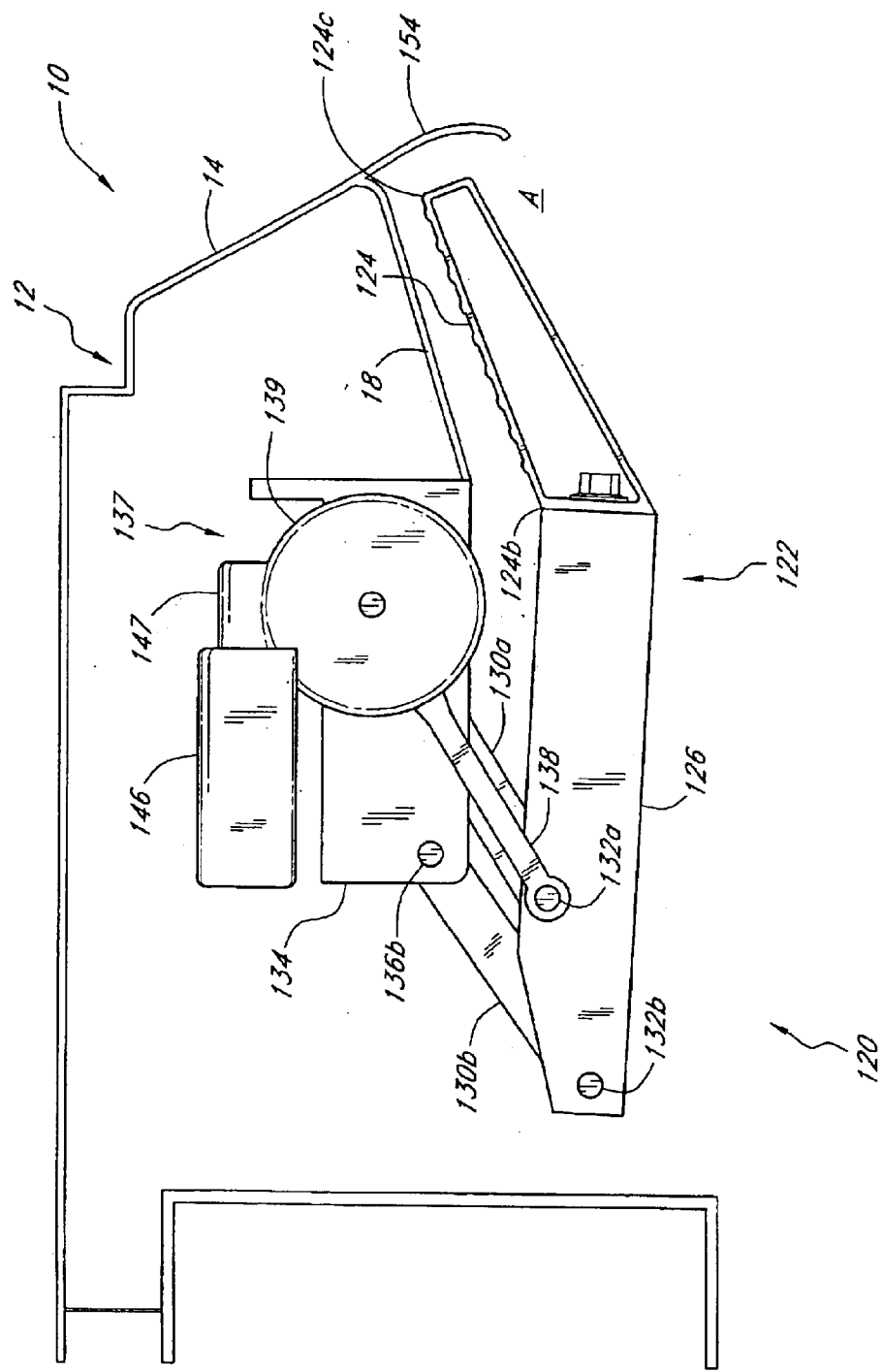
FIG. 5 is a side elevation view of the retractable vehicle step of FIG. 3, in the retracted position.

Another embodiment of a retractable vehicle step 120 is shown in FIGS. 3–5. The retractable step 120 comprises a stepping member 122 that includes a stepping deck 124 bolted or otherwise rigidly connected to a support bracket 126. The stepping deck 124 has an outboard end 124a and an inboard end 124b. Front and rear support arms 130a, 130b are rotatably connected to the support bracket 126 via pins 132a, 132b. A rigid frame 134, which may be configured as necessary for connection to the vehicle underbody 12, provides a secure mounting for the support arms 130a, 130b which are rotatably mounted to the frame 134 via pins 136a, 136b.

As with the embodiment shown in FIGS. 1–2, the retractable vehicle step 120 depicted in FIGS. 3–5 defines the following axes of rotation, best seen in FIG. 4: a first axis A—A about which the front support arm 130a rotates with respect to the underbody 12 and/or frame 134; a second axis B—B about which the rear support arm 130b rotates with respect to the underbody 12 and/or frame 134; a third axis C—C about which the front support arm 130a and support bracket 126 rotate with respect to each other; and a fourth axis D—D about which the rear support arm 130b and support bracket 126 rotate with respect to each other. FIG. 3, as a side elevation view of FIG. 4, depicts the axes A—A, B—B, C—C, D—D as points. The first axis A—A is spaced from the third axis C—C by a first distance X and the second axis B—B is spaced from the fourth axis D—D by a second distance Y. (In other words, the first axis A—A is spaced from the rotatable connection of the front support arm 130a to the step member 122 by the first distance X, and the second axis B—B is spaced from the rotatable connection of the rear support arm 130b to the step member 22 by the second distance Y.) In one embodiment, the first and second distances X, Y are unequal; in another embodiment the first distance X is greater than the second distance Y. In one embodiment, the first axis A—A is located upward from the second axis B—B.

As best seen in FIG. 4, each of the support arms 130 comprises a generally planar, unitary member which forms two coaxial bearing members 131 at either end thereof. The coaxial bearing members may comprise coaxial bores which engage pins in the frame and step member to rotatably connect the support arm to each. In other embodiments the coaxial bearing members may comprise coaxial axle portions which engage bores formed in the frame/step member to provide the rotatable connections. Alternatively, one or both of the support arms may form a single bearing member at one or both ends, comprising a single full-width bore or a single, central partial-width bore.

The spacing of the coaxial bearing members 131 defines a connection width CW at each end of each support arm. The connection width represents the distance between the opposite ends of the engagement of the bearing members with the frame/stepping member. For example, in FIG. 4 the support arm 130a is rotatably connected to the frame along an upper connection width, which equals the distance between the outer edges of the coaxial bearing members 131. The support arm 130a is connected to the step member along a lower connection width. The support arm 130b likewise defines an upper connection width and a lower connection width. These four connection widths are shown in FIG. 4 as being approximately equal, but they may be varied in relative size as desired.

The support arms 130a, 130b also include a rigid crosspiece 133 interconnecting the bearing members 131. The crosspiece is advantageously of sufficient strength to prevent the support arms 130a, 130b from substantially deflecting from their planar configuration when a user steps on the stepping deck 124. The crosspiece may take on any suitable configuration, such as the full-size member shown, or a series of individual cross members extending horizontally or diagonally in an "X" pattern, etc. The high rigidity of the crosspiece and the arms 130a, 130b as a whole advantageously permits the width of the arms to be minimized while nonetheless providing stable support for the stepping deck 124 when in the extended position.

The front and rear support arms may take on other forms and configurations so long as each comprises a generally planar linkage connecting the step member to the frame. A "generally planar linkage" may advantageously comprise a generally planar, unitary member such as support arm 130*a* or support arm 130*b* as shown in FIG. 4. An alternative "generally planar linkage" comprises two or more separate arms (employed in place of a single unitary arm) interconnecting the frame and step member, the arms being coplanar by virtue of a common upper axis of rotation associated with rotatable connection of the arms to the frame, and a common lower axis of rotation associated with rotatable connection of the arms to the step member opposite the frame. As with a unitary arm, a multiple-arm planar linkage defines at either end thereof a connection width extending between the outer edges of the coaxial bearing members formed by the outermost arms making up the linkage.

With further reference to FIGS. 3 and 4, the support bracket 126 may comprise any suitable structural member having sufficient rigidity to resist bending about its horizontal and longitudinal axes. Thus the box configuration shown in FIG. 4 is particularly suitable, but those skilled in the art will appreciate that the bracket 126 can take on other shapes known to those skilled in the art. The relatively small connection width of the arms 130 permits the bracket 126 to be made of minimal width as well. By making the bracket 126 of sufficient length, the stepping deck 124 will be positioned properly for easy use when the step 120 is in the deployed position (see FIG. 3) and the length of the arms 130 can be kept to a minimum.

Referring now to FIG. 4, the depicted support bracket 126 comprises a unitary member forming an upper surface 127, lower surface 129 and first and second side segments 141, 143. In the illustrated embodiment, the upper surface 127 forms an opening 145 through which the lower portions of the first and second support arms 130*a*, 130*b* may be inserted, into a recessed area 149 bounded by the lower surface 129 and the first and second side segments 141, 143. In other words, the first and second support arms 130*a*, 130*b* are inserted into the opening 145 or recessed, area 149 at the third and fourth axes C—C, D—D, respectively.

As best seen in FIG. 3, the support bracket 126 preferably forms an angle with the stepping deck 124, and thus extends upward and rearward from the substantially level (when in the extended position) upper surface of the deck 124. Consequently, the preferred angled configuration further enables the length of the support arms 130 to be minimized. The step member 122 may thus be said to move between an upward-rotated orientation in the retracted position (FIG. 5) to a downward-rotated orientation in the deployed position (FIG. 3). In other words, the step member 122 rotates downward about its connection with the support arm 130*b* when moving to the deployed position, and rotates upward about the same connection when moving to the retracted position. When in the retracted position the stepping deck 124 tilts upward (with the outboard end 124*a* located upward from the inboard end 124*b*), minimizing the total downward protrusion of the retractable step from the vehicle underbody. Preferably, this upward tilt is at least 20°, to facilitate any water or debris draining off the step and thereby enhance its safety when in use.

With the stepping member 122 moveably connected to the frame 134 via the support arms 130*a*, 130*b*, it can be moved between the retracted position A and the extended position B, as shown in FIGS. 5 and 3, respectively. As with the embodiment described previously, the retractable step 120 provides a sturdy step for a vehicle user when in the extended position B. The geometry of the stepping member 122, support arms 130, and frame 134 causes the arm 130*a* to be loaded in tension and the arm 130*b* to be loaded in compression when a load is applied to the stepping deck 124 in a manner similar to that shown in FIG. 1. Accordingly, the arm 130*b* urges the arm 130*a* against a stop 152 when a user steps on the stepping deck 124, by applying a horizontal reaction force to the step member 122. The stop 152 prevents motion of the drive arm 138 beyond a location chosen so that when the drive arm 138 strikes the stop 152, the step 120 is in a configuration where it tends to move further away from the retracted position upon application of a load to the stepping deck 124, but is prevented from doing so by virtue of the stop. Due to this convergence of factors, the extended step 120 firmly maintains its deployed position in which the support bracket 126, and therefore the step member 122, are for practical purposes entirely supported by the support arms 130*a* and 130*b*, without input from motor 146 (discussed in further detail below), when stepped upon by a user. This feature eliminates the need for a separate locking mechanism, often seen in the form of a hydraulic lock, to maintain the stepping deck in the deployed position when in use. Consequently, this feature enhances the ease of use of the retractable step, as the user is not required to operate or disengage the lock when retracting or deploying the step, thereby eliminating an undesirable aspect of prior-art retractable step systems.

A drive system 137 provides powered movement of the step 120 between the retracted and the extended position. The drive system 137 comprises a drive arm 138 coupled to a rotor 139, both of which are rotatably mounted on the pin 136*a*, and a motor 146 drivingly connected to the drive arm 138 via the rotor 139. The drive arm 138 is connected to the rotor 139 so as to rotate in concert therewith about the pin 136*a*. In another embodiment, the rotor and drive arm form an integral unit.

The motor 146 can be mounted to the frame 134, to the vehicle underbody, or in any other suitable location. The motor 146 drives the rotor, drive arm, stepping member, etc. via, for example, a worm gear 147 that meshes with teeth (not shown) formed on the circumference of the rotor 139. In another embodiment, the motor may comprise a linear actuator that pushes or pulls on the circumference of the rotor 139 in order to rotate it in either direction. Of course, any suitable means of coupling the motor to the rotor/drive arm may be used. Advantageously, a window motor may be used to drive the apparatus. Preferably, the motor will adjust for changes in temperature.

The drive system 137, or any drive system employed with any of the embodiments of the retractable step disclosed herein, may advantageously include a system to stop the motion of the step member, arms, etc. when an obstruction is encountered within the range of motion of the step, or within the moving parts of the step. Such a system reduces the risk of a pinching injury when a person has inadvertently inserted his or her hand, arm, etc. within the mechanism, and also reduces the potential for damaging the step member or other parts of the retractable step when it approaches or strikes a hard object such as a curb. It is contemplated that a standard anti-pinch/anti-strike system may be used, as is known in the art.

A dust cover or cap 154 may be mounted to the lower body panel 18 to provide a storage location for the stepping member 122 and prevent dust or grime from collecting on the stepping deck 124. The dust cover 154 advantageously has a portion that protrudes downward from the lower surface of the vehicle and extends across the gap formed between the upper surface of the deck 124 and the adjacent vehicle structure, and may extend or curl around the outer edge of the deck 124. Thus the dust cover 154 forms a protective pocket around the outer edge and upper surface of the deck 124. It has been found that the dust cover 154 reduces the accumulation of water, dust, mud and/or debris on the deck, providing a substantial benefit in terms of safety and aesthetics while reducing the chance of soiling the user's clothes when he or she steps on or stands near the deck.

The retractable step thus utilizes a relatively compact linkage system to support the stepping deck 124 when in the deployed position. The relatively short, compact support arms 130 can be made of minimal width, as can the frame 134 and support bracket 126. The stepping deck 124 can thus be made substantially wider than the frame/support arms/support bracket. In other words the stepping deck 124 is preferably substantially wider than any of the connection width(s) defined by the support arms. Advantageously, the stepping deck is about 2–8 times as wide as the frame, support arms, support bracket or any of the connection width(s) defined by the support arms. Thus the retractable step provides a wide stepping deck for the vehicle user while minimizing the width and space requirements of the frame, linkage system, etc.

Figure 6B:
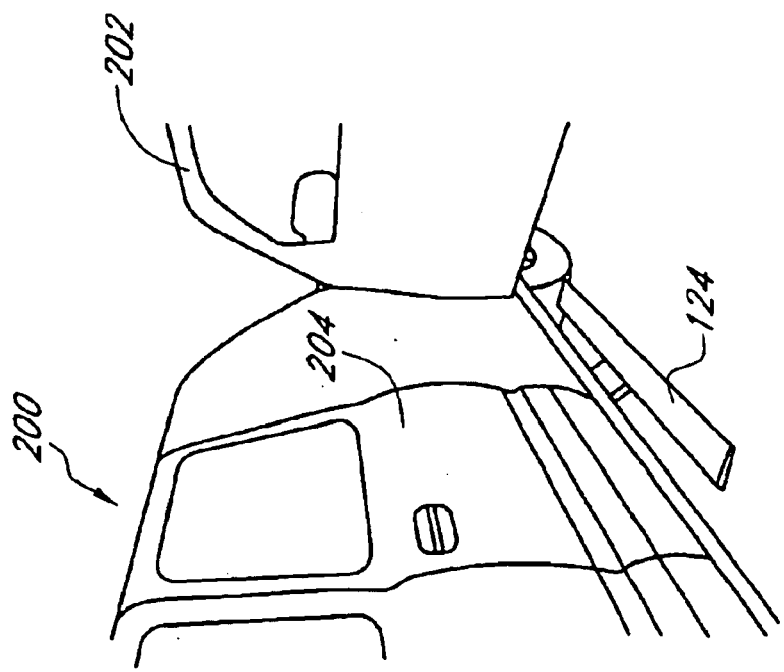
FIGS. 6A–6B are perspective views of the retractable vehicle step as used in connection with a vehicle.
Figure 6A:
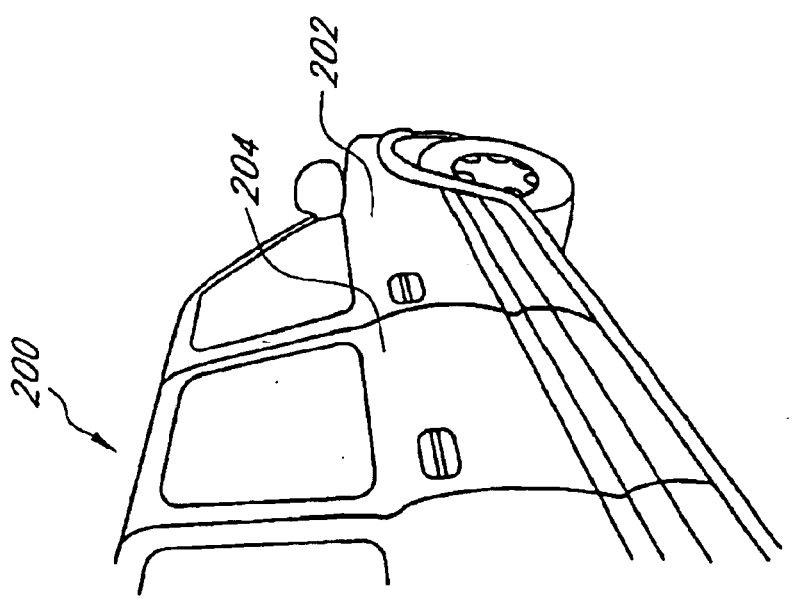

The wide stepping deck 124 and relatively narrow frame/support arms/support bracket permit a single retractable step to serve as a convenient step assist for two adjacent doors of a vehicle, without occupying a large amount of space under the vehicle with the frame, support arms and support bracket. FIG. 6A shows a vehicle 200 having on one side thereof a front door 202 and an adjacent rear door 204. In FIG. 6A no portion of the retractable vehicle step is visible because it is in the retracted position. FIG. 6B shows the stepping deck 124 of the retractable step after it has moved to the extended position (upon opening the front door 202 or in response to other actions as detailed above). It is readily seen that the deck 124 provides a convenient step assist for a person desiring to enter the vehicle through either of the doors 202, 204. Where the deck 124 extends in front of about ¼ of the width of each door, the deck will be sufficiently wider than the user's foot to provide an easy-to-use step. Extending the deck to cover about ½ the width of each door provides an additional safety factor above a ¼-width deck. A deck which extends across substantially the entire width of both doors is most advantageous in that it essentially eliminates the need for the user to look down to the step when placing a foot upon it, facilitating easy use by a person carrying a large number of items with them.

More broadly stated, the novel configuration of the retractable step permits the width of the stepping deck to be selected largely independently of the width of the frame, arms and/or support bracket. Consequently, a stepping deck that is intended to serve as a step for two adjacent doors need not extend the entire width of the doors. It may instead be only about 4–5 feet wide (in comparison to a standard fixed running board which is typically 6–8 feet in width), providing a convenient step while keeping the size and weight of the overall device to a minimum. It has been found that this particular width provides an optimal balance between providing ease of use (via a relatively wide deck) and avoiding an overly large, bulky device. Likewise, the stepping deck of a retractable step intended for use with a single vehicle door may be reduced to an optimal deck width which is less than the entire width of the door.

Accordingly the retractable step of the present invention delivers benefits in terms of space utilization, convenience, reliability and economy.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A retractable vehicle step, comprising:

a step member having a stepping deck and a support bracket portion extending inboard from said stepping deck;

a first support arm; and a second support arm;

said first support arm and said second support arm connectable with respect to an underside of a vehicle so as to be pivotable about a first pivot axis and a second pivot axis, respectively;

said first support arm and said second support arm connected to said step member so that said first support arm and said second support arm are pivotable with respect to said step member about a third pivot axis and a fourth pivot axis, respectively, said fourth pivot axis located inboard from said third pivot axis;

said first support arm and said second support arm allowing said step member to move between a retracted position and a deployed position downward and outboard from said retracted position;

at least one of said first support arm and said second support arm extending downward and outboard from said first and second pivot axes, respectively, when said step member is in said deployed position;

wherein said stepping deck is substantially wider than said support bracket portion;

wherein said support bracket portion provides a recessed area into which said first support arm is inserted at said third pivot axis.

2. The retractable vehicle step of claim 1, wherein both of said first support arm and said second support arm extend downward and outboard from said first and second pivot axes, respectively, when said step member is in said deployed position.

3. The retractable vehicle step of claim 1, wherein said support bracket portion includes a lower surface, and said recessed area is bounded by said lower surface.

4. The retractable vehicle step of claim 1, wherein at least one of said first support arm and said second support arm further comprises a first end which forms at least two spaced-apart coaxial bearing members suitable for pivotable connection with respect to said underside of said vehicle.

5. The retractable vehicle step assist of claim 4, wherein said at least one of said first support arm and said second support arm further comprises a second end which forms at least two spaced-apart coaxial bearing members pivotably connected to said step member.

6. The retractable vehicle step of claim 1, wherein said support bracket portion provides an opening in an upper surface of said support bracket portion into which opening said first support arm is inserted at said third pivot axis.

7. The retractable vehicle step of claim 6, wherein:

said first support arm comprises a unitary support arm defining an inboard surface and an outboard surface, a maximum distance between said inboard surface and said outboard surface defining a first thickness, said first support arm defining a substantially vertical first side and a substantially vertical second side, a maximum distance between said first side and said second side defining a first width, said first width being substantially greater than said first thickness.

8. The retractable vehicle step of claim 7, wherein:

said second support arm comprises a unitary support arm defining an inboard surface and an outboard surface, a maximum distance between said inboard surface and said outboard surface defining a second thickness, said second support arm defining a substantially vertical first side and a substantially vertical second side, a maximum distance between said first side and said second side defining a second width, said second width being substantially greater than said second thickness.

9. The retractable vehicle step of claim 6, wherein said upper surface of said support bracket portion extends outboard of said third pivot axis.

10. The retractable vehicle step of claim 9, wherein said support bracket portion further comprises a lower surface opposite said upper surface.

11. The retractable vehicle step of claim 10, wherein said lower surface of said support bracket portion extends outboard of said third pivot axis.

12. The retractable vehicle step of claim 6, wherein said second support arm is inserted into said opening at said fourth pivot axis.

13. The retractable vehicle step of claim 6, wherein said support bracket portion comprises a first side segment and a second side segment located on opposite sides of said opening, wherein said first side segment and said second side segment comprise a unitary member.

* * * * *

UNITED STATES PATENT AND TRADEMARK OFFICE
CERTIFICATE OF CORRECTION

PATENT NO. : 6,830,257 B2
DATED : December 14, 2004
INVENTOR(S) : Horst Leitner

It is certified that error appears in the above-identified patent and that said Letters Patent is hereby corrected as shown below:

<u>Column 12,</u>
Line 53, after "step" delete "assist".

Signed and Sealed this

Fourth Day of April, 2006

JON W. DUDAS
*Director of the United States Patent and Trademark Office*